United States Patent
Yu et al.

(10) Patent No.: US 6,732,199 B1
(45) Date of Patent: May 4, 2004

(54) SOFTWARE PROGRAMMABLE CALENDAR QUEUE CACHE

(75) Inventors: JungJi John Yu, Saratoga, CA (US); Chih-Wei Chao, Milpitas, CA (US); Fu-Kuang Frank Chao, Cupertino, CA (US)

(73) Assignee: Watchguard Technologies, Inc., Seattle, WA (US)

( * ) Notice: Subject to any disclaimer, the term of this patent is extended or adjusted under 35 U.S.C. 154(b) by 0 days.

(21) Appl. No.: 09/464,886

(22) Filed: Dec. 16, 1999

Related U.S. Application Data

(60) Provisional application No. 60/112,745, filed on Dec. 17, 1998.

(51) Int. Cl.[7] .................. G06F 13/10; G06F 13/14; G06F 13/16
(52) U.S. Cl. ................. 710/52; 710/53; 710/54; 710/55; 710/6; 710/29; 710/39; 709/3; 709/5; 709/8
(58) Field of Search ............... 710/6, 29, 36, 710/39, 52, 53, 54, 55; 709/1, 3, 5, 8

(56) References Cited

U.S. PATENT DOCUMENTS

| | | | |
|---|---|---|---|
| 5,371,852 A | | 12/1994 | Attanasio et al. |
| 5,473,599 A | | 12/1995 | Li et al. |
| 5,764,895 A | * | 6/1998 | Chung ..................... 370/402 |
| 5,842,007 A | * | 11/1998 | Tarsky et al. ............ 340/825.2 |
| 5,864,854 A | * | 1/1999 | Boyle ...................... 707/10 |
| 6,016,315 A | * | 1/2000 | Chambers et al. ........ 370/378 |
| 6,061,784 A | * | 5/2000 | Tarsky et al. ............ 709/231 |
| 6,104,700 A | * | 8/2000 | Haddock et al. ......... 370/235 |
| 6,205,154 B1 | * | 3/2001 | Schmidt et al. .......... 370/458 |
| 6,247,061 B1 | * | 6/2001 | Douceur et al. ......... 340/825.5 |
| 6,335,935 B2 | * | 1/2002 | Kadambi et al. ......... 370/389 |

OTHER PUBLICATIONS

U.S. patent application Ser. No. 09/465,123, Lin, filed Dec. 16, 1999.
Abadi, M., et al., "Secure Web Tunneling," http://pa.bell–labs,com/~abadi/Papers/tunnel/206.html, pp. 1–13 (Dec. 16, 2000).
"Intel ISP Program Case Studies: UUNET Canada Leads the Industry in Move to Virtual Provate Networks," http: www.intel.com/isp/casestudies/uunet.htm, pp. 1–4 (2000).
"Tunnel Switching: 3Com Technology Boosts VPN Security and Flexibility," http://www.3com.com/technology/tech_ net/white papers/503049.html, pp. 10 (1999).
"Vitural Multi–megabit Access Path: Affordable and Available Internet and IP Access at Speeds Greater than T1," http://www.tiaranetworks.com/vmapwp.html, pp. 1–9 (1999).
"Web Workshop—Virtual Private Networking: An Overview," http://msdn.Microsoft.com/workshop/server/feature/ vpnovw.asp, pp. 1–16 (May 29, 1998).

(List continued on next page.)

*Primary Examiner*—Rehana Perveen
(74) *Attorney, Agent, or Firm*—Arnall Golden Gregory LLP

(57) ABSTRACT

A system and method for scheduling packet output according to a quality of service (QoS) action specification. A system is provided with a calendar queue with a plurality of bandwidth timeslots, wherein the bandwidth timeslots are organized into groups. A look-up logic circuitry inspects a group of bandwidth timeslots substantially simultaneously and determines from the group a first unoccupied bandwidth timeslot in which a current packet can be scheduled. The look-up logic circuitry also determines a first occupied bandwidth timeslot that contains a next packet to be transmitted.

13 Claims, 3 Drawing Sheets

OTHER PUBLICATIONS

Feguson, Paul and D. Senie, "Network Ingress Filtering: Defeating Denial of Service Attacks Which Employ IP Source Address Spoofing," http://andrew2.Andrew.cmu.edu/rfc/rfc2267.html, pp. 1–16 (Jan. 1998).

"The NetBoost Policy Engine: Comprehensive Platform Enables Today's Leading Policy Enforcement Applications to Operate at Full Wire Speed," NetBoost Corporation, pp. 1–9 (1998).

"The NetBoost Policy Appliance: Device Enables Concurrent Operation of Multiple Policy Enforcement Applications to Operate at Full Wire Speed," NetBoost Corporation (1998).

"NetBoost PE—1000: Network Application Engine," NetBoost Corporation (1998).

NetBoost SKD: Software Development Kit, Net Boost Corporation (1998)..

"A New Breed: The Net Boost Platform for Policy Enforcement Applications," NetBoost Corporation, pp. 1–11 (1998).

Russell, Paul, "Keeping the TCP/IP Stream Flowing," Linux Magazine, http://www.linux–mag.com/1999–08/bestdefemse02.html, pp. 1–8 (Aug. 1999).

* cited by examiner

SOFTWARE PROGRAMMABLE CALENDAR QUEUE CACHE

RELATED APPLICATIONS

This applications claims the benefit of priority to U.S. Provisional Patent Application No. 60/112,745; filed Dec. 17, 1998.

TECHNICAL FIELD

The present invention relates to a calendar queue for enforcing quality of service action specs and, in particular, to a calendar queue that utilizes a fast lookup logic to speed the process of filling and emptying the cache.

BACKGROUND

In one type of policy network, a Calendar Queue is used to schedule the output packets after policy enforcement according to the corresponding bandwidth (QoS Action Spec) which specifies when and how often the packets should depart. Conventionally, the mechanism is based on a queue that includes a plurality of equally spaced time slots. One timeslot represents one bandwidth unit. If the queue is implemented by hardware, then one time slot can be one external memory location, with these slots being contiguous external memory space. The operation is shown in FIG. 1.

When the packet for a given QoS Action Spec leaves the system, the conventional system first invalidates the current slot and advances to the new slot for next schedule after a bandwidth interval. If the new slot turns out to be valid (occupied by another QoS Action) then the system searches for the nearest invalid slot after the occupied one to schedule the next packet. In FIG. 1, the QoS Action Spec #20 that has a bandwidth equal to 2 represents this case.

The Action Spec #20, according its bandwidth, should be inserted to the time slot 2. But since the slot 2 has been occupied by the Action Spec #21 then the available slot 3 is selected. Checking the valid bit and searching the first available invalid bit involve a lot of memory access operations. Use of external memory creates a long latency for scheduling the packets. Even worse, if the memory is also shared by other processors, the arbitration time can make the latency even longer.

SUMMARY

The present invention is a method of scheduling packet output in accordance to a quality of service (QoS) action specification. A calendar queue of bandwidth timeslots is maintained, wherein the bandwidth timeslots are organized into groups. Look-up logic circuitry is invoked that inspects the bandwidth timeslots of a group in the queue substantially simultaneously. The look-up logic circuitry determines from the group a first unoccupied bandwidth timeslot in which a current packet can be scheduled and also determines from the group a first occupied bandwidth timeslot which contains a next packet to transmit.

DETAILED DESCRIPTION

Figure 1:
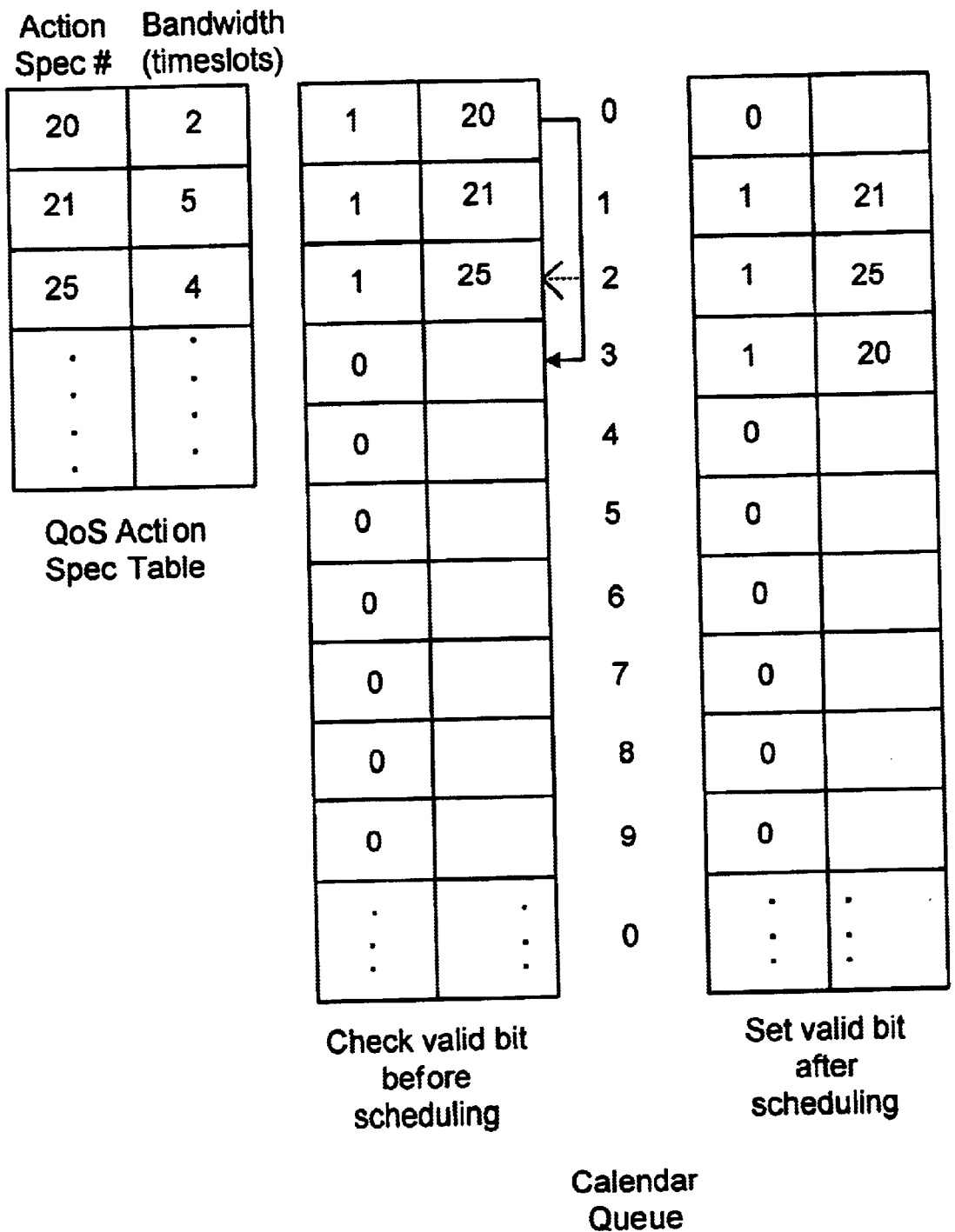
FIG. 1 illustrates a conventional calendar queue mechanism.
Figure 2:
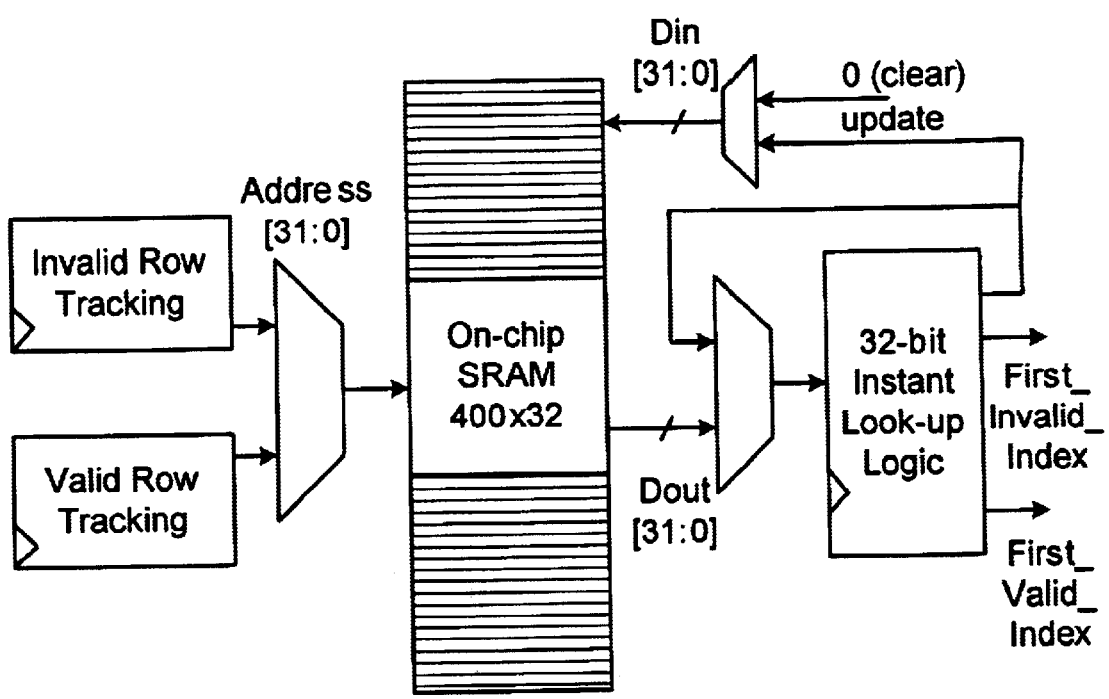
FIG. 2 illustrates an improved calendar queue mechanism in accordance with an embodiment with the invention.

In accordance with an embodiment of the present invention as shown in FIG. 2, an on-chip memory (e.g., SRAM) is employed to cache the valid bits of the calendar queue. In addition, an innovative fast look-up logic has been developed to speed up the search for the first available invalid bit.

The structure shown in FIG. 2 basically performs two operations. The first operation is to find the first valid bit (occupied time slot) so that the system can transmit the packets for the current Action Spec. The second operation is to find the first invalid bit (empty time slot) so that the current Action Spec can be scheduled for next departure.

In this structure, each 32-bit entry in SRAM represents 32 valid bits of 32 timeslots. (This embodiment employs 32-bit entry. However, other sized entries could be employed.) Therefore a small 400×32 SRAM can accommodate all valid bits of a calendar queue with 12K timeslots. As a result, 32 timeslots can be scanned in a single cycle and both the first empty slot and the first occupied slot in the current row (where one row represents 32 timeslots), if any, can be found in a single cycle.

If all slots in the current row are occupied, then the Invalid_Row_Tracking logic increments the row index and then the system advances to the next 32 timeslots to start the next scan for an available entry. On the other hand if all slots in the current row are empty, then the Valid_Row_Tracking logic increments the row index and then the system advances to next 32 timeslots to starts next scan for a valid entry.

Figure 3:
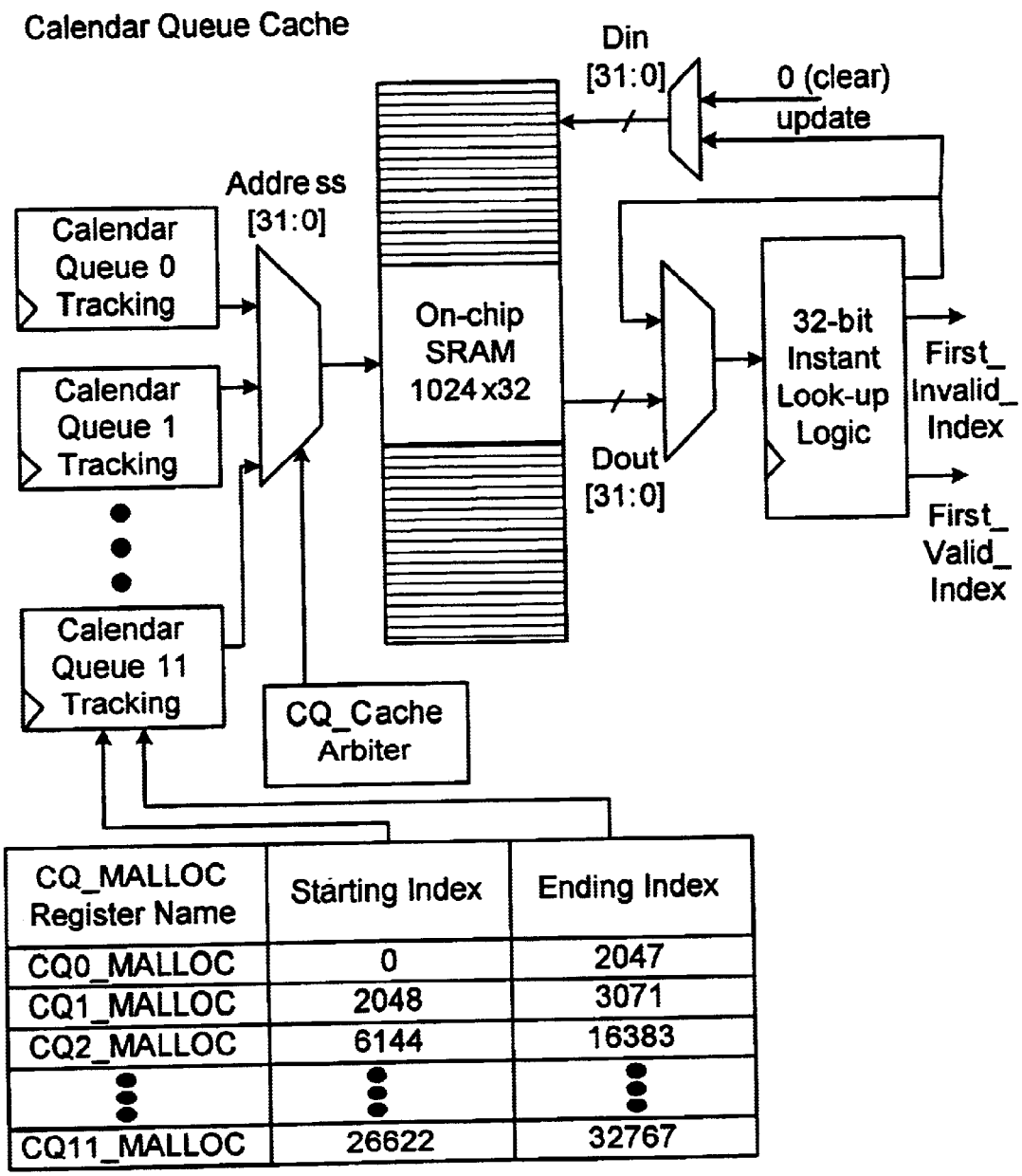
FIG. 3 illustrates a programmable memory allocation mechanism usable with the FIG. 2 embodiment.

In accordance with an embodiment of the invention described in FIG. 3, a programmable memory allocation mechanism distributes the whole time slots memory space to multiple calendar queues according to their different needs and requirements. The example in FIG. 3 illustrates that the network manager can configure the ports and the corresponding calendar queues such that the calendar queue 11 uses 6K slots and the calendar queue 2 uses 10K slots because the queue 11 and 2 require a lot of timeslots. With the total 32K timeslots, the rest of the calendar queues uses the remaining 16K slots. By enabling this configuration, the programmable calendar queue cache achieves very high performance and still maintains very low cost.

Put another way, this embodiment employs a "sharing of on-chip time slots". Once could argue that each calendar queue can be designed with its dedicated time slot memory on the chip. That would, however, make the chip very, very large and expensive, particularly in a large system. Sharing of time slots provides a solution, particularly in a low-end environment where time slot granularity is not critical. On the other hand, for a very high end solution, all the time slots can be dedicated to one calendar queue (or one port). Thus, it can be seen that the software programmable calendar queue is flexible so as to enable the system to fit into multiple requirements by way of programming the calendar queue size. As to how the distribution is done by the software, this is the decision of each application.

What is claimed is:

1. A method of scheduling packet output in accordance to quality of service (QoS) action specification, comprising the steps of:

providing a memory;

maintaining a plurality of calendar queues of bandwidth timeslots in the memory, wherein the bandwidth timeslots are organized into groups, the maintaining step including allocating the memory to the plurality of calendar queues;

providing a look-up logic circuitry; and for each calendar queue, invoking the look-up circuitry that inspects the bandwidth timeslots of a group in the queue substantially simultaneously, wherein the lookup logic circuitry determines from the group a first unoccupied bandwidth timeslot in which a current packet can be scheduled and also determines from the group a first occupied bandwidth timeslot which contains a next packet to transmit.

2. The method of claim 1, wherein allocating the memory to the plurality of calendar queues further comprises the steps of:

programming sizes of the plurality of calendar queues; and configuring ports of the plurality of calendar queues.

3. The method of claim 2 further comprising the step of tracking the ports of the plurality of calendar queues.

4. The method of claim 2, wherein the step of programming sizes of the plurality of calendar queues further comprises the step of assigning a starting index and an ending index to a tracking logic of each calendar queue.

5. The method of claim 1 further comprising the steps of:

selecting a selected tracking logic; and retrieving an entry from a calendar queue associated with the selected tracking logic.

6. An apparatus for implementing programmable calendar queues that schedule output packets, the programmable calendar queues scheduling the output packets according to a quality of service action specification, the apparatus comprising:

a computer readable memory, the memory storing information on bandwidth timeslots of the programmable calendar queues, wherein the bandwidth timeslots are distributed among the programmable calendar queues;

a table having a plurality of entries, each entry being assigned to a calendar queue, each entry having a starting index and an ending index assigned to its associated calendar queue; and a plurality of calendar queue tracking logics, wherein each calendar queue tracking logic receives the starting index and the ending index from the table.

7. The apparatus of claim 6, wherein the starting index and the ending index of each calendar queue can be configured by a network manager.

8. The apparatus of claim 6, further comprising:

a multiplexer receiving inputs from the plurality of calendar queue tracking logics; and an arbiter logic for selecting an input from the plurality of calendar queue tracking logics to access the memory.

9. A method for improving performance of a plurality of calendar queues, the method comprising the steps of:

storing a table with a plurality of entries on a computer readable memory;

assigning one entry of the table to one calendar queue, wherein each entry has a starting index and an ending index;

delivering the staring index and the ending index of an entry to a corresponding calendar queue tracking logic; and selecting a selected calendar tracking logic from a plurality of calendar tracking logics to access a calendar queue associated with the selected calendar tracking logic.

10. The method of claim 9 further comprising the step of modifying the starting index of an entry of the table.

11. The method of claim 9 further comprising the step of modifying the ending index of an entry of the table.

12. The method of claim 9 further comprising the step of assigning one value for both the starting index and the ending index.

13. The method of claim 9 further comprising the steps of:

allocating a computer readable memory location for storing time slots; and distributing the time slots among the plurality of calendar queues.

* * * * *